United States Patent [19]
Kürbitz

[11] Patent Number: 4,588,895
[45] Date of Patent: May 13, 1986

[54] DEVICE FOR THE TRANSMISSION OF INFORMATION

[75] Inventor: Gunther Kürbitz, Königsbronn-Zang, Fed. Rep. of Germany

[73] Assignee: Carl-Zeiss-Stiftung, Heidenheim on the Brenz, Fed. Rep. of Germany

[21] Appl. No.: 503,312

[22] Filed: Jun. 10, 1983

[30] Foreign Application Priority Data

Jun. 15, 1982 [DE] Fed. Rep. of Germany ....... 3222441

[51] Int. Cl.⁴ ............................................. G02B 27/00
[52] U.S. Cl. ................................... 250/551; 455/602
[58] Field of Search ............... 250/551, 237 R, 216, 250/228; 455/602; 307/311; 350/96.2

[56] References Cited

U.S. PATENT DOCUMENTS 4,109,998 8/1978 Iverson ............................... 250/551
4,456,903 6/1984 Kishi et al. ......................... 455/602
4,466,695 8/1984 Kruger ............................... 350/96.2

Primary Examiner—David C. Nelms
Attorney, Agent, or Firm—Stonebraker, Shepard & Stephens

[57] ABSTRACT

In a device for the transmission of information between two apparatus parts which rotate relative to each other with the use of a modulated luminous flux and a photo-sensitive receiving means, it is seen to it, by the introduction of diaphragms within the ray path that the modulated luminous flux does not strike the receiving means directly. In this way the radiation flow received with constant transmission signal by the receiving means is prevented from experiencing modulation upon rotation of the two apparatus parts with respect to each other.

6 Claims, 1 Drawing Figure

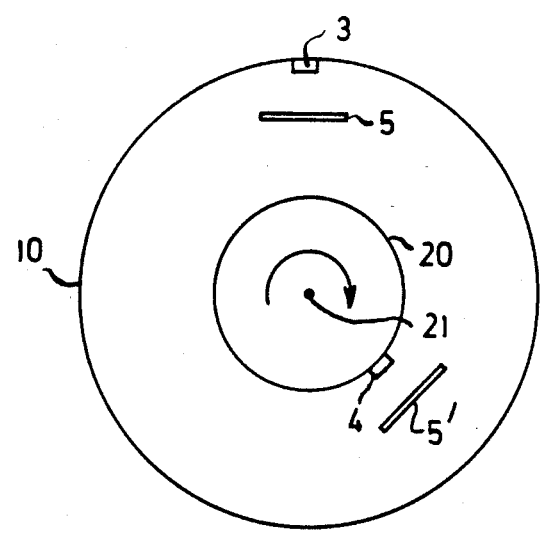

DEVICE FOR THE TRANSMISSION OF INFORMATION

SUMMARY OF THE INVENTION

The present invention relates to a device for transmitting information between a rotating part and a stationary part of an apparatus, one of the apparatus parts bearing at least one source of light for a modulated light flux containing the information to be transmitted and the other apparatus part bearing at least one photosensitive receiving means.

In such devices the greatest possible freedom from mechanical wear is desired. Furthermore, no additional noise should be introduced into an existing circuit by such a device.

For the transmission of signals and/or energy between two apparatus parts which rotate relative to each other the use of mechanical slip rings is already known. This is understood to mean a metal ring which is connected via a spring contact with an electric circuit part, and upon rotation or translation produces electrical contact by a wiping action. Thus, for instance, a metal ring can be connected to the rotor of an electrical generator, and so-called brushes rest on that ring for the feeding or removal of the current. Such slip rings are subject to a large amount of wear, lead to frictional losses, and cause undesired electrical heat. If the slip rings are old there may also be brief interruptions in the making of contact.

U.S. Pat. No. 4,190,318 discloses a device for the transmission of information between two apparatus parts which rotate relative to each other, and which employs a modulated light flux and a photosensitive detector, and which is characterized by the use of a plurality of transmission and/or reception means arranged at a regular distance apart on the periphery of one of the apparatus parts. One disadvantage of this known device is that with a constant transmission signal, the signal received by the receiving means experiences modulation upon rotation of the two apparatus parts with respect to each other. A noise signal caused by the rotation is thus superimposed on the information signal which is to be transmitted. Transmission of analog-coded information is thereby prevented in the case of this known device. Even with suitable digital coding of the information to be transmitted, a considerable dynamic range of the electronic circuit parts is necessary due to the amplitude modulation of the signals which is caused by the rotation.

The object of the present invention is to provide a device which is free of the disadvantages of the known device for transmitting information and/or energy between two apparatus parts which rotate relative to each other. The information is, furthermore, to be transmitted in a form which is easy to process electronically.

This object is achieved in accordance with the invention in the manner that the apparatus part which bears the source of light and the apparatus part which bears the receiving means have surfaces which reflect as completely as possible but diffusely and that, between the source of light and the receiving means, there is arranged at least one diaphragm which is so developed that no direct light from the source of light and no light which has been reflected only once from the source of light strikes the receiving means.

The wavelength region of the light used for the device may extend from ultraviolet to infrared.

The diaphragms used also advantageously have a surface which reflects as completely as possible but diffusely. In this way the result is obtained that the radiation flux received by the receiving means with constant transmission signal is practically constant even upon rotation of the apparatus parts with respect to each other and regardless of the relative position of the parts.

For the electronic processing of the information it can be coded digitally or transmitted in analog form.

The advantages obtained by the invention reside particularly in the freedom of the information signal from noise signals caused by the rotation, the ease of processing the information transmitted, and the possibility of transmitting several information flows at the same time.

For the transmission of several information flows one can either provide a plurality of optically separate channels or a separate wavelength range can be associated with each information flow.

One illustrative embodiment of the invention will be described in further detail below.

BRIEF DESCRIPTION OF THE DRAWING

The single FIGURE of the drawing is a schematic representation of apparatus embodying the invention, having a source of light and a light-sensitive receiver and two diaphragms.

DESCRIPTION OF THE PREFERRED EMBODIMENT

In the embodiment shown, the outer part 10 of an apparatus is stationary and bears a source of light 3 whose modulated luminous flux contains the information to be transmitted. The inner part 20 of the apparatus rotates around an axis 21 and contains a light-sensitive receiving means 4 which converts the received modulated luminous flux from the source of light 3 into electrical signals. The direction of flow of the radiation can also be reversed so that the outer part contains the receiving means and the inner part the source of light. It is also conceivable for the outer part to rotate and the inner part to be stationary.

The dynamics of the photosensitive receiving means is so great in the illustrative embodiment of the invention that the electrical signals produced by it are a clear measure of the information transmitted, regardless of the distance of the receiving means from the source of light. The diaphragms 5, 5' see to it that the directly emitted light from the source of light 3 does not strike the receiving unit 4. Source of light, receiving unit and diaphragm are provided with a surface which reflects as completely as possible but diffusely. As well known in the art, a material having this reflection characteristic is chalk.

With this arrangement, the radiation flow received with constant transmission signal by the receiving means is prevented from experiencing modulation upon rotation of the two apparatus parts with respect to each other.

In the preferred embodiment, the first diaphragm 5 is mounted on the stationary part 10 of the apparatus so that it is always in front of the stationary emission source 3, and the second diaphragm 5' is mounted on the rotating part 20 of the apparatus so that it is always in front of the receptor 4. If plural emission sources and receptors are used (to provide for simultaneous transmission of two or more streams of information, using different wavelength or frequency regions for each) the different sources and receptors, respectively, may be spaced from each other either axially or circumferentially. In either case, the respective diaphragms are mounted as above described, so as to be in front of their respective sources and receptors.

With this arrangement, it is seen that there will never be a direct passage of luminous flux from a source to a receptor, nor even a passage with only one reflection, but the passage will always involve at least two reflections. For example, flux from the source 3 will first strike the diaphragm 5 and be reflected thereby back onto the concave wall of the stationary part 10, from which it will be reflected or bounced back toward the receptor 4, with possibly some intermediate reflections back and fourth between the convex wall of the rotor 20 and the concave stationary wall 10 before finally reaching the receptor 4.

What is claimed is:

1. A device for transmitting information between a rotating part and a stationary part of an apparatus, said device comprising:
    (a) a rotating part;
    (b) a stationary part;
    (c) at least one source of light mounted on one of said parts;
    (d) said source producing a modulated luminous flux containing information to be transmitted;
    (e) at least one photosensitive receiving means mounted on the other of said parts; and
    (f) diaphragm means mounted on at least one of said parts;
    (g) said source and said receiving means and said diaphragm means being so formed and so positioned relative to each other that no light from said source can reach said receiving means until such light has been reflected more than once;
    (h) said parts of said apparatus and at least a portion of said diaphragm means having reflecting surfaces which reflect impinging light completely but diffusely.

2. The invention defined in claim 1, wherein said diaphragm means includes a diaphragm mounted in front of said source in position to intercept light issuing from said source.

3. The invention defined in claim 1, wherein said diaphragm means includes a diaphragm mounted in front of said receiving means in position to obstruct light from entering said receiving means without first being reflected by a surface of said diaphragm.

4. The invention defined in claim 1, wherein said source is a source of digitally coded light.

5. The invention defined in claim 1, wherein said source is a source of analog modulated light.

6. A device for transmitting optical signals between a stationary part and a rotating part, said device comprising:
    (a) two parts, one of which is rotatable and the other of which is stationary;
    (b) one of said parts having a first cylindrical wall whose inner surface is a diffuse reflecting surface;
    (c) the other of said parts having a second cylindrical wall located within and concentric with said first cylindrical wall, said second cylindrical wall having an outer surface which is a diffuse reflecting surface;
    (d) a signal light source mounted on one of said parts, and a reflecting screen diaphragm mounted on said one of said parts in front of said light source between said source and the reflecting surface of the other of said parts; and
    (e) a light responsive receiver mounted on the other of said parts, and a reflecting screen diaphragm mounted on said other part in front of said receiver between said receiver and the reflecting surface of the part on which said source is mounted;
    (f) said two parts and said source and said receiver and said diaphragms being so placed and arranged relative to each other that while one of said parts is rotating, a light signal emanating from said source will be reflected by said diaphragm located in front of said source and will be reflected again by the cylindrical reflecting surface of the part on which said source is mounted before ultimately reaching said receiver.

* * * * *